Aug. 12, 1924.
G. CHADWICK
1,504,545
DECALCOMANIA TRANSFERRING MACHINE
Filed Aug. 19, 1922　　3 Sheets-Sheet 1
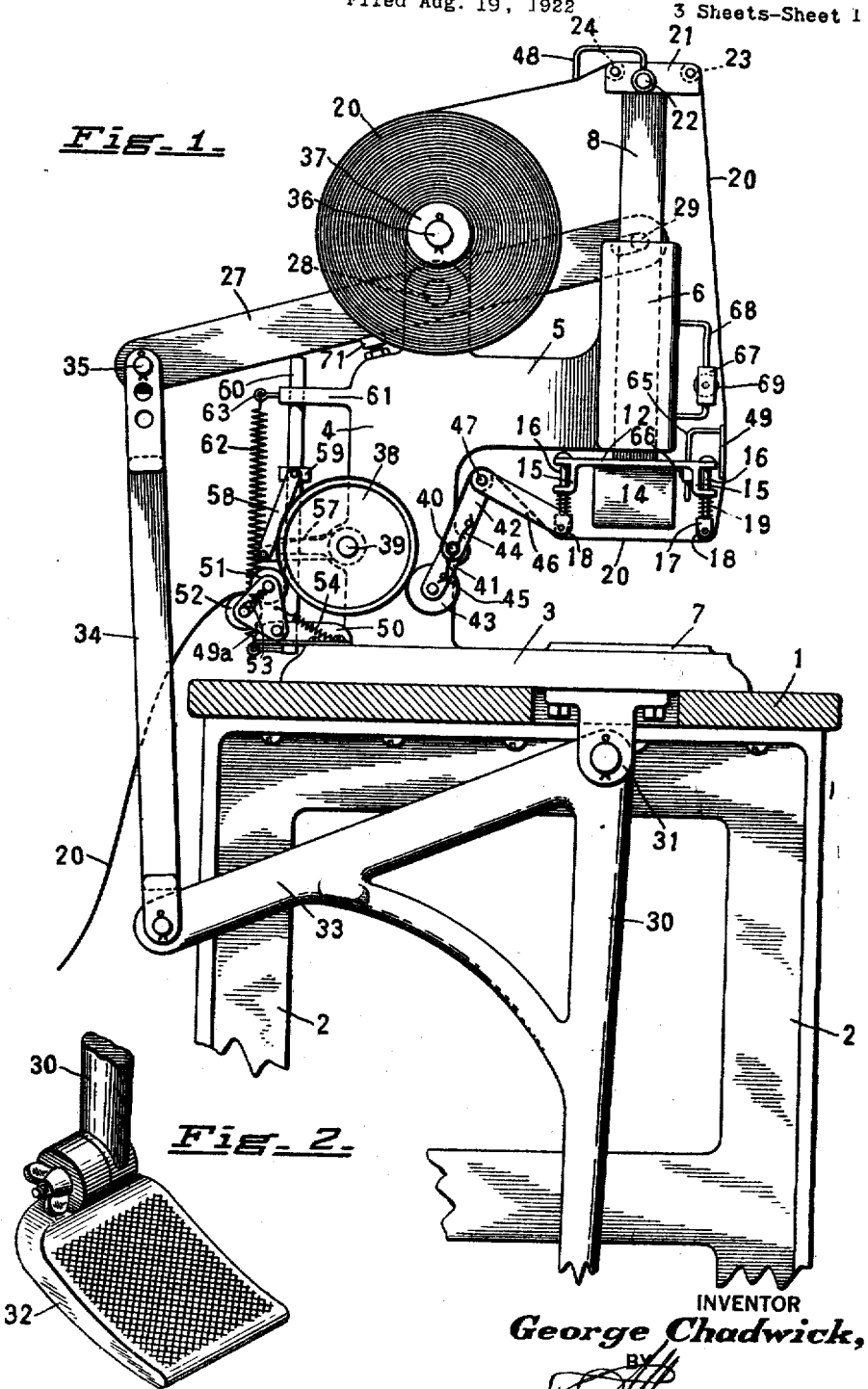
INVENTOR
George Chadwick,
BY
ATTORNEY Aug. 12, 1924.
G. CHADWICK
DECALCOMANIA TRANSFERRING MACHINE
Filed Aug. 19, 1922     3 Sheets-Sheet 2
1,504,545
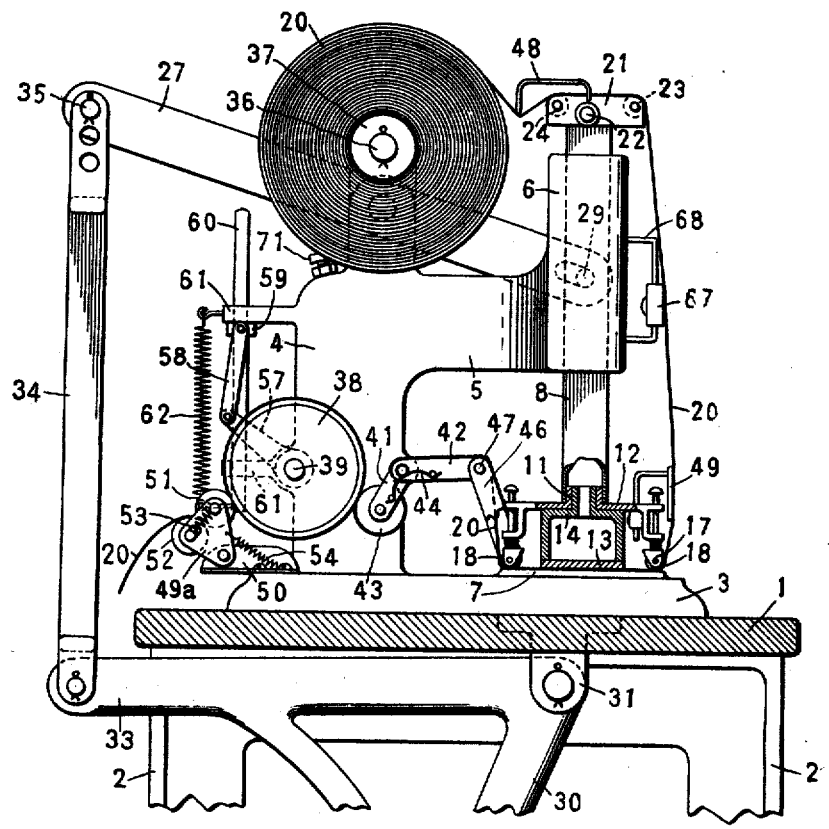
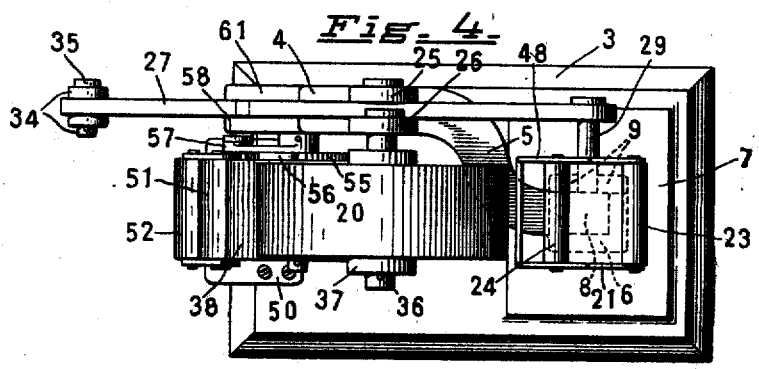
INVENTOR
George Chadwick,
ATTORNEY

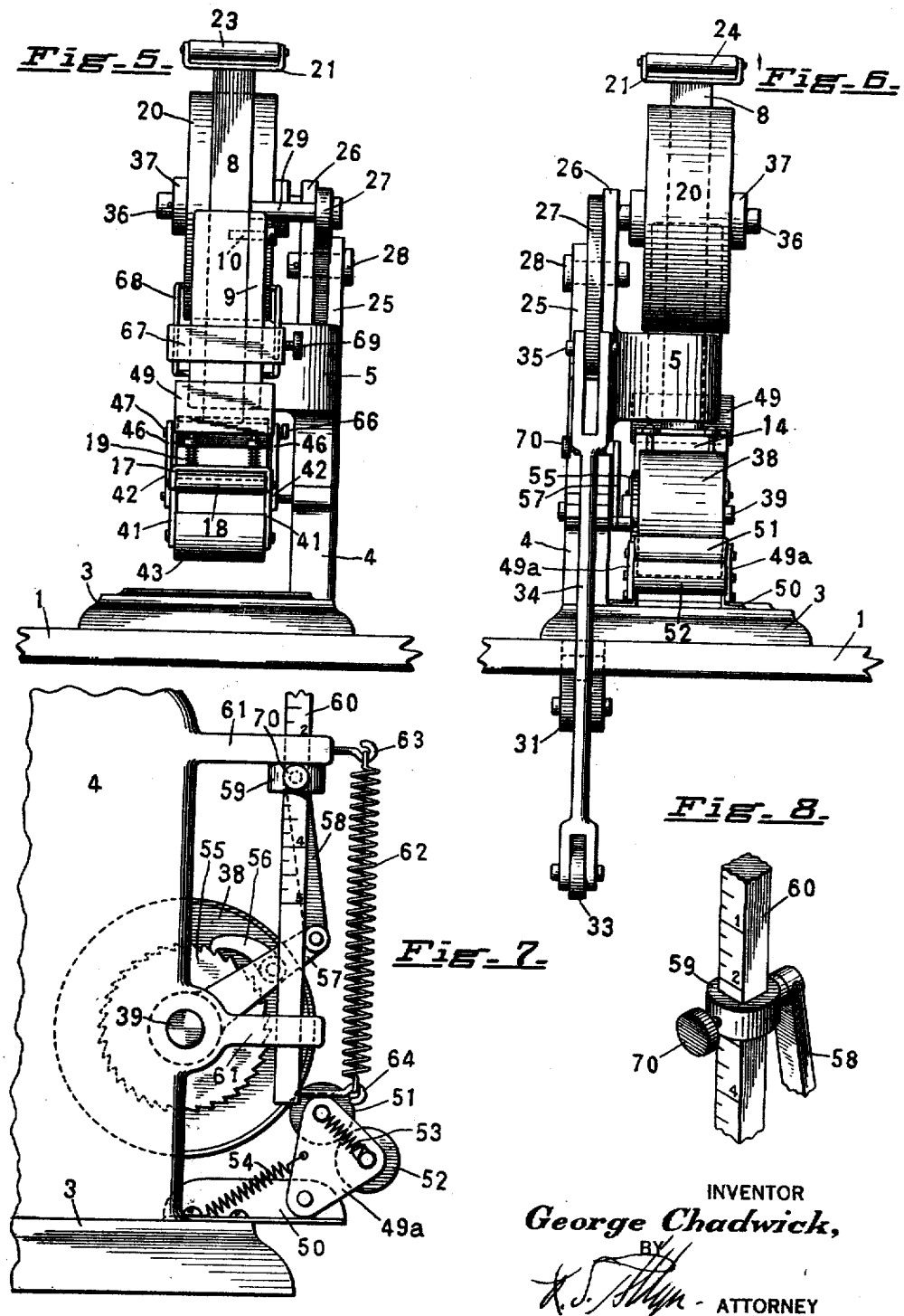

Patented Aug. 12, 1924.

1,504,545

UNITED STATES PATENT OFFICE.

GEORGE CHADWICK, OF NEW YORK, N. Y.

DECALCOMANIA-TRANSFERRING MACHINE.

Application filed August 19, 1922. Serial No. 582,893.

*To all whom it may concern:*

Be it known that I, GEORGE CHADWICK, a citizen of the United States of America, residing at New York, N. Y., have invented a new and useful Decalcomania-Transferring Machine, of which the following is a specification.

This invention relates to an improvement in decalcomania transferring machines.

Decalcomanias like other designs vary in size in accordance with the particular use to which they are to be put, and thus occupy different lengths of the tape from which they are to be transferred. The decalcomanias on any given transfer tape should be uniformly spaced, but the spacing on different tapes varies with the size of the designs on the particular tape. Moreover any given tape varies appreciably in length in accordance with conditions such as the humidity of the atmosphere, and thus changes the spacing of the decalcomanias on the tape. An object of this invention is to provide a transferring machine having adjustable tape feeding mechanism arranged to advance any tape precisely the distance between one decalcomania and the next each time a transfer is made, so that the decalcomania shall always be accurately centered under the presser iron when an article is stamped.

Another object is to provide a transferring machine in which the tape being fed to the presser is visible to the operator, who may therefore pass over any imperfect designs and immediately note any breaks or defects in the tape.

Still another object is to provide means for indicating to the operator the relative position of the decalcomania and presser iron, so that any inaccuracy of centering may be corrected before the article is stamped, and the feed adjusted if necessary.

A further object of the invention is to provide a machine in which the tape travels with the presser so as not to interfere with the work, but is held out of contact with the presser until the moment when the decalcomania is to be transferred to the article, thus avoiding crystallization of the decalcomania due to overheating.

A further object is to provide a machine in which the tape is advanced over the presser while the latter is moving away from the work so that the operator may check the position of the next decalcomania when the presser is at rest at the end of its upward stroke.

Still another object of the invention is to provide means for maintaining an even tension on the transfer tape, to prevent breakage or slackening of the tape.

Another object is to provide in a decalcomania transferring machine a quickly detachable presser iron which may be variably positioned with respect to the tape so as to cooperate with tapes of various width and having decalcomania of different lengths on the tape.

Other objects will become apparent as the description progresses. One embodiment of the invention is illustrated in the drawings, in which:

Fig. 1 is an elevation, partly in section, showing the left hand side of a transferring machine in normal position, Fig. 2 is a perspective of a treadle, Fig. 3 is a view similar to Fig. 1 showing the machine in operating position, Fig. 4 is a plan of the machine shown in Fig. 3, Fig. 5 is a front elevation of the machine, Fig. 6 is a rear elevation of the machine, Fig. 7 is a view showing on a larger scale certain elements of the tape-feeding mechanism as seen from the right of the machine, and Fig. 8 is a fragmentary perspective of a detail.

A table 1 having legs 2 of any desired length supports the base 3 of the transferring machine. A frame 4 preferably cast integral with the base rises from one of the rear corners of the latter, and has a forwardly extending neck portion 5 which terminates in the three sided guideway 6. This guideway is preferably of square cross section and located above the center of a work rest 7 which occupies the forward portion of base 3. The work rest or support may, as shown, be slightly raised from the base to facilitate placing and removing piles of articles to be stamped, but this is not essential. A slide 8 is mounted for vertical movement in the guideway 6, being held therein by two retaining plates 9 which are detachably secured to the right hand edges of the guideway as by the cap screws 10, thus partially closing the open side of the guideway. Slide 8 is preferably made tubular, to receive at its lower end two lugs 11 punched upwardly from the center of a plate 12. A presser iron having a face portion 13 and body portion 14 rests against the lower side of the plate, the iron and plate being removably fastened to the slide by frictional engagement, or by suitable screws or pins not shown. Within the body of the presser is the usual heating element, gas or electric, which is supplied with power through the tubular slide 8 in a well known manner not illustrated. From opposite edges of plate 12 there depend two or more brackets 15 bored to receive pins 16 which also pass through holes in plate 12. The set of pins 16 at each edge of plate 12 carries at its lower end a yoke 17 the downturned ears of which support a roller 18. Suitable springs 19 are provided to normally hold the rollers 18 in a plane somewhat below that of the face of the presser iron 13, but when the slide 8 is lowered in its guideway, the rollers are lifted by engagement with the work lying on rest 7 to compress springs 19 and allow the presser iron to press tape 20 against the work.

The channel shaped carriage 21 is removably secured to the upper end of slide 8 as by pin 22 which passes through the flanged portions of carriage 21 and the two lateral faces of slide 8. Rollers 23 and 24 are mounted at the front and rear extremities of the flanges of carriage 21 respectively.

From the rear portion of frame 4 there extends an upward projection 25 and a somewhat longer projection 26. An operating lever 27 is loosely mounted on a pin 28 carried by said projections. A bolt 29 passes through a slot in the front end of lever 27 and is detachably secured to slide 8 in any desired manner, as by threads, to operatively connect the lever and slide. A bell crank 30 is pivotally suspended from bearings 31 which may be bolted to the base 3 of the machine, a suitable aperture being provided in table 1, as seen in Fig. 1. Crank 30 carries at its lower end a foot treadle 32 of any desired type. The upper arm 33 of the crank is connected by a link 34 with the rear end of slide operating lever 27. Thus when the operator presses treadle 32 to the rear, link 34 is raised, the front end of lever 37 is depressed and thus the slide and presser iron are moved downwardly until the iron presses tape 20 against the work lying on rest 7. The distance through which treadle 32 must be pushed to bring the presser iron in contact with the work will vary with the height of the pile of articles on the rest at any particular time, and may also be varied by passing pin 35 which connects link 34 and lever 27 through one of a number of holes provided to receive said pin in the upper end of the link.

Loosely mounted on a pin 36 carried at the upper end of frame extension 26 is a spool 37 carrying a supply of transfer tape 20. The tape on the spool is advanced by the rotation of a feed drum 38 revolubly mounted on a shaft 39 carried near the rear edge of frame 4. On a shaft 40 extending laterally to the left from the front edge of frame 4 are pivotally mounted two similar links 41 and two other links 42, a roller on shaft 40 maintaining the links in spaced relation. Links 41 carry at their lower end a roller 43 which is normally held in engagement with feed drum 38 by springs 44 mounted just outside links 42 on shaft 40, which co-operate with lugs 45 on said links and tend to keep the links 41 and 42 in alinement. The links 42 are prevented from moving into such relation with links 41 by a pair of links 46 which connect yoke 17 at the rear of the presser iron to said links 42 as by a pin 47. Preferably a roller is also carried on pin 47.

The transfer tape 20 passes from its spool 37 under a tension wire 48, whose ends are loosely mounted on carriage 21, over rollers 24 and 23 downwardly directly in front of guideway 6 and slide 8, over a target 49, to be described, and front roller 18, across the face of presser 13 but normally out of contact therewith as shown in Fig. 1, thence under rear roller 18, over the rollers carried by pins 47 and 40, under roller 43 which presses it against feed drum 38 and over the upper portion of said drum. To insure sufficient friction between tape 20 and feed drum 38 two spaced plates 49ª pivoted on angles 50 at the rear of base 7 carry two rollers 51 and 52. Roller 52 is mounted in slots as shown in Fig. 3 and is held against roller 51 by tension springs 53. A spring 54 normally holds roller 51 in engagement with drum 38, thus rotation of drum 38 in an anti-clockwise direction as seen in Figs. 1 and 3 will rotate rollers 51 and 52 in reverse direction to draw tape 20 away from the feed drum.

Drum 38 carries at its inner face a ratchet wheel 55 with which a pawl 56 mounted on an arm 57 co-operates to rotate the feed drum. Arm 57 may be loosely mounted on shaft 39 and is connected at its free end by a rod 58 with a collar 59, all as best seen in Fig. 7. Collar 59 is slidably mounted on a bar 60 which is vertically reciprocable in guides 61 which extend rearwardly from frame 4. A spring 62 secured to pins 63 and 64 carried by upper guide 61 and the lower end of bar 60 respectively, constantly tends to lift bar 60 until its upward movement is limited by the engagement of collar 59 with the lower surface of upper guide 61, during which upward motion pawl 56 slides over the teeth of ratchet wheel 55 without affecting the latter. Bar 60 is, however, normally held in its extreme downward position by the pressure of the lower side of lever 27 against the upper end of said bar as shown in Fig. 1.

When articles are to be stamped a spool 37 of transfer tape is positioned on pin 36 and secured thereto as by the cotter pin shown, and the tape is led over the rollers and the feed drum as previously described. Target 49 is carried by a bent rod 65 which passes through plate 12 and a depending lug thereon, and may be adjusted in a vertical direction and clamped as by a thumb screw 66. After the tape is positioned over the rollers, target 49 is adjusted so that a decalcomania will have its upper edge in registry with the upper edge of target 49 when a preceding decalcomania is correctly positioned beneath presser iron 13. Thus the operator by observing the relative position of the decalcomania resting on target 49 and the upper edge of the target, may be assured of the accurate centering of a decalcomania to be stamped on the article which is next to be marked. If desired an additional target 67 may be slidably mounted on guide wires 68 projecting laterally and forwardly from the front of guideway 6 and may be secured in any particular position by a thumb screw 69. If a target 67 is employed it should be adjusted when the machine is in its normal position illustrated in Fig. 1, and then clamped. Target 67 may be used to the exclusion of target 49 or in addition thereto or may be omitted entirely as desired.

With the machine in the position shown in Fig. 1, the tape having been drawn through the rollers and across the feed drum and the heat turned on iron 13, the stamping of articles may be begun. The articles to be marked are placed on rest 7, in a pile if desired, and the operator presses treadle 32 to the rear. Crank arm 33 acting through link 34 and lever 27 lowers slide 8 and presser 13 into engagement with the top-most article in the pile. Tape 20, however, is held out of engagement with the iron until the pressure of the article on rollers 18 compresses springs 19 and lifts said rollers relative to plate 12, whereupon continued downward movement of slide 8 brings iron 13 into engagement with the upper surface of the transfer tape which is pressed against the article to be marked, and the transfer is made, the apparatus being at this time in the position shown in Fig. 3. The operator then releases treadle 32 and the weight of crank 30, aided if desired, by springs, not shown, lowers link 34 and the rear end of lever 27 and raises the presser iron to its normal position shown in Fig. 1.

Before putting a new transfer tape on pin 36 the distance between successive decalcomanias is determined and collar 59 is set so that its upper edge will coincide with a figure of the scale into which one side of bar 60 is graduated corresponding to the distance between successive designs. The collar is then clamped in place as by a thumb screw 70 and the amount of the tape advanced upon each upward movement of slide 8 and presser 13 will be equal to the distance between designs. This result is brought about by so positioning the zero mark of the scale on bar 60 that when the upper surface of collar 59 is set to zero the top of bar 60 will be lightly engaged by the lower surface of the rear portion of lever 27 when in its lowermost position, as seen in Fig. 1. Obviously if collar 59 were in this position the lifting of the rear portion of lever 27 would not permit spring 62 to move bar 60 and no feeding of tape would ensue in consequence of operation of the presser. However, if collar 59 is adjusted as shown in Fig. 8, at a point corresponding to two and one-quarter inches advance of the tape, then the lifting of the rear portion of lever 27 at the beginning of the downward stroke of slide 8 and presser 13 would permit spring 62 to raise bar 60 until collar 59 engaged the lower surface of upper stop 61. During such upward motion of bar 60, pawl 56 slips from tooth to tooth of ratchet 55 producing no effect thereon. However, towards the end of the return stroke of the slide, presser and lever 27, the lower surface of the lever will engage the upper end of bar 60 and force it downward to its normal position, the downward travel of lever 27 being limited by a rubber headed cap screw 71 mounted on frame 4. The scale on bar 60 is so graduated that the travel of the bar from its upward position to its normal position will cause pawl 56 to advance ratchet wheel 55 and rotate feed drum 38 through an angle which will advance the tranfer tape two and one-quarter inches. Obviously the actual scale distance representing any particular advance of the tape will depend on the relative proportions of the feed drum, ratchet wheel and connections between the latter and bar 60 as well as the relative position of said bar and the fulcrum of lever 27.

In order to provide closer adjustment than would be permitted by the distance from one tooth on ratchet wheel 55 to the next tooth, there may be provided a plurality of ratchet wheels 55 each having teeth of equal length but in staggered relationship, and pawl 56 may be wide enough to engage anyone of the ratchet wheels, or individual pawls may be provided for each ratchet. Thus, when during the operation of the machine the operator by observing target 49 or 67, or both, notices that the designs to be transferred are not accurately centered on account of variation in length of the type, slippage of the tape or some other cause, he may loosen thumb screw 70 and change the adjustment of collar 59 with respect to bar 60 and then by manually drawing the tape through its guide rolls correctly center the next design. Thereafter the drum will be rotated to feed the proper length of tape for each operation of the presser. To facilitate accurate adjustment of collar 59, there may be provided an auxiliary collar having a thumb screw for quick adjustment and connected with collar 59 by a feed screw for slow adjustment of collar 59.

In order to prevent slippage of the transfer tape between its spools 37 and feed drum 38, it is desirable to maintain an even tension on the tape regardless of the position of the moving parts of the machine. The length of tape between drum 38 and rear roller 18 is maintained constant by the links 41—42 and 46 and their connecting pins or rollers during the reciprocations of the slide 8 so that no variation in tension results at this portion of the tape. However, as the slide moves from its position shown in Fig. 1 to that shown in Fig. 3, the length of tape between the portion of the tape-supply tangent to the outer periphery thereof and front roller 18, does vary. During the downward movement of slide 8 tape will be unrolled from the spool until rollers 18 are forced upwardly by the work or work rest, whichever they engage, whereupon the slack in the tape between front roller 18 and spool 37 will be taken up by tension wire 48. Ordinarily the weight of the tension wire is sufficient to maintain an even tension in the tape, but if desired, it may be pressed downwardly as by a spring, not shown. During the upward movement of slide 8 the slack between roller 24 and the spool will be taken up by the tension wire, until towards the end of the upward movement the rotation of feed drum 38 in advancing the next design under the presser iron draws the tape taut and lifts the transverse portion of wire 48 to the position shown in Fig. 1. The friction of spool 37 on roller 36 should ordinarily be sufficient to prevent the unrolling of extra tape from the spool, but if desired, this friction may be increased by suitable braking.

Where the transferring machine is to be used for various designs, the face of presser 13 will most desirably be of rectangular shape, its length being determined by the greatest width of tape which the width of the various guide rollers and the feed drum will accommodate. The breadth of the presser face is determined by the maximum length of tape occupied by the longest design which would be found on such a wide tape. When narrower tape is used the slide may be removed from guide-way 6 by unscrewing the cap screws 10 and removing strips 9. The slide may then be turned through an angle of 90° and replaced. Thus the presser face may be so co-related with the tape as to cover any design on any width tape for which the transferring machine is adapted. When the slide is thus rotated, pin 22 may be withdrawn and carriage 21 likewise rotated through 90° so as to cooperate with the tape 20, perforations being provided in all four faces of slide 8 to permit this change. Sometimes it is not practical to have a single presser iron adapted for all the different designs which may be stamped by a single machine. When this is the case there may be provided additional units, consisting of presser irons, slides and carriages assembled together so that one unit may be interchanged for another having a presser iron of suitable size for the work to be performed by merely removing the strips 9 and making the substitution in the manner described for rotation of the slide. When such rapidity of exchange is not necessary one presser iron may be withdrawn from its slide 8 and another one of different dimensions substituted in the slide.

It is to be noted that the tape passing between roller 23 and front roller 18 over target 49 is at all times directly before the operator who thus without effort may observe any defective designs. When such a design is observed it is merely necessary to draw the tape manually past the face of the presser iron when the defective design has been automatically fed beneath said iron, so as to position the next perfect design under the presser iron, thereby avoiding the marking of any imperfect designs on the work. The target 49 in addition to indicating the relative position of a design and the presser iron, by its frictional engagement with the tape tends to aid the guide rollers and tension wire in preventing slippage of the tape which might cause incorrect centering of the designs.

It is further to be noted that the feeding of the tape just at the end of the upward stroke of the slide enables the operator to check the positioning of the next decalcomania while the machine is at rest in the position shown in Fig. 1, as well as during the next downward movement of the slide. The rollers 18 hold the section of tape carrying the decalcomania to be next transferred sufficiently far out of the plane of the face of the presser iron as to prevent pre-heating of the decalcomania which might result in crystallization. The heat of the presser iron is not applied to the transfer tape until the tape itself has been brought into engagement with the work and clamped in such position by rollers 18 which also prevent slippage of the tape at the time the transfer is made.

While one specific embodiment of the invention has been described with much particularity, it is to be understood that this is merely for the purpose of clearness but not to limit the scope of the invention, reference being had to the appended claims for this purpose.

I claim:

1. A decalcomania transferring machine comprising a movable presser iron adapted to press a transfer tape against work to be marked, a lever to actuate the presser, a drum to feed the tape, and a bar moved by the lever to rotate the drum.

2. A decalcomania transferring machine comprising a movable presser iron adapted to press a transfer tape against work to be marked, a lever to actuate the presser, a drum to feed the tape, a ratchet wheel mounted for rotation with the drum, an arm having a pawl to operate the ratchet, and a bar moved by the lever to operate the arm.

3. A decalcomania transferring machine comprising a movable presser iron adapted to press a transfer tape against work to be marked, a lever to actuate the presser, a drum to feed the tape, a ratchet wheel mounted for rotation with the drum, an arm having a pawl to operate the ratchet, a bar reciprocable by the lever, and a collar slidably mounted on the bar and operatively connected to the arm.

4. A decalcomania transferring machine comprising a movable presser iron adapted to press a transfer tape against work to be marked, means for moving the presser, a drum to feed the tape across the presser, a one-way clutch to rotate the drum, and means responsive to the operation of said presser moving means for operating said clutch, said means including a reciprocable bar carrying a relatively adjustable member to control the extent of the operation of the clutch and drum.

5. A decalcomania transferring machine comprising a movable presser iron adapted to press a transfer tape against work to be marked, means for moving the presser, a drum to feed the tape across the presser, a one-way clutch to rotate the drum, means responsive to the operation of said presser moving means for operating said clutch, two relatively adjustable members to control the extent of the operation of the clutch and drum, and means for indicating the length of the tape to be advanced by operation of the feed drum.

6. A decalcomania transferring machine comprising a movable presser adapted to press a transfer tape against work to be marked, a lever to actuate the presser, a reciprocable bar positioned in the path of movement of the lever and adapted to be moved thereby, a collar adjustably mounted on the bar, a stop engaged by the collar to limit the movement of the bar in one direction, a drum to feed the tape across the presser, and connections between the drum and collar to rotate the drum in response to movement of the bar.

7. A transferring machine comprising a frame, a slide, a tape carriage secured to one end of said slide, a tape presser secured to the other end of said slide, a tape carrier rotatably carried by said frame, tape feeding means carried by said frame and means for reciprocating said slide and the carriage and presser.

8. A decalcomania transferring machine comprising a reciprocable presser, two spaced members to guide a transfer tape across the presser, a feed drum for the tape, said drum being rotatable about a stationary axis, and hinged tape guiding means interconnecting the drum and one of said members to maintain constant the length of tape therebetween.

9. A decalcomania transferring machine comprising a frame, a slide carrying a tape presser at its lower end and reciprocable relatively to the frame, a supply of transfer tape, a tape guide in front of the upper end of the slide, a second tape guide near the presser and in a plane in front of the first guide, and means for feeding the tape over said two guides and across the presser whereby designs on the tape will be rendered prominently visible to an operator previous to passing across the presser.

10. In a decalcomania transferring machine a frame, a vertically extending slide reciprocable relatively to the frame, a tape presser carried at the lower end of the slide, a supply of transfer tape behind the slide, a tape guide in front of the upper end of the slide, a second tape guide near the presser and farther to the front than the first guide, and means for feeding the tape over said two guides downwardly in front of the slide and rearwardly across the presser whereby designs on the tape will be moved the full length of the slide prominently in view of an operator before passing across the presser.

11. A decalcomania transferring machine comprising a frame having a guideway, a slide mounted therein, a presser carried at one end of the slide, a carriage at the other end of the slide, a spool adapted to carry a supply of transfer tape rotatably mounted on the frame, and means for guiding tape across the carriage in front of the guideway and across the presser, whereby the tape is visible to an operator before crossing the presser.

12. A decalcomania transferring machine comprising a frame, a slide mounted for reciprocation relative thereto and carrying a tape-presser, means for feeding a tape in front of the frame towards and across the presser, and means for indicating to an operator the relative position of a design on the tape and the presser.

13. A decalcomania transferring machine comprising a frame, a slide mounted for reciprocation relative thereto and carrying a tape-presser, means for feeding a tape in front of the frame towards and across the presser, and a target adapted to contact with the tape as it approaches the presser to indicate the position of a design on the tape relative to the presser.

14. A decalcomania transferring machine comprising a frame, a slide mounted for reciprocation relative thereto and carrying a tape-presser, means for feeding a tape in front of the frame towards and across the presser, and an adjustably mounted target adapted to contact with the tape as it approaches the presser to indicate the position of a design on the tape relative to the presser.

15. A decalcomania transferring machine comprising a frame, a slide adapted to carry a tape presser and a target, and means for guiding a transfer tape across the target to the presser, said target being adjustable relatively to the presser whereby the relative position of one design on the tape and the presser will be indicated by the relative position of a succeeding design and the target when the designs on the transfer tape are uniformly spaced.

16. A transferring machine comprising a frame, a tape roll carrier rotatably supported by said frame, a tape feeding drum rotatably carried by said frame, a reciprocating slide carried by said frame, a tape carriage secured to one end of said slide and a tape presser secured to the opposite end of said slide.

17. A transferring machine comprising a frame, a tape roll carrier rotatably supported by said frame, a tape feeding drum rotatably carried by said frame, a reciprocating slide carried by said frame, a tape carriage secured to one end of said slide, a tape presser secured to the opposite end of said slide and a target intermediate the carriage and presser for indicating the location of designs on the tape with respect to the presser.

18. A transferring machine comprising a frame, a slide, a tape carriage secured to one end of said slide, a tape presser secured to the other end of said slide, a tape carrier rotatably carried by said frame, tape feeding means carried by said frame, means for reciprocating said slide and the carriage and presser, and target means carried by said slide adjacent said presser.

19. A transferring machine comprising a frame, a tape roll carrier rotatably supported by said frame, a tape feeding drum rotatably carried by said frame, a reciprocating slide carried by said frame in front of said carrier and said drum, a tape carriage secured to one end of said slide, a tape presser secured to the opposite end of said slide, and a guide for said tape in front of said slide.

GEORGE CHADWICK.